United States Patent Office 3,396,122
Patented Aug. 6, 1968

3,396,122
SULFUR DIOXIDE ABSORBENT
Lothar W. Brauer, Berlin, Germany, assignor to Auergesellschaft G.m.b.H., Berlin, Germany, a corporation of Germany
No Drawing. Filed Nov. 17, 1964, Ser. No. 411,701
3 Claims. (Cl. 252—428)

ABSTRACT OF THE DISCLOSURE

Sulfur dioxide absorbents in which a granular carrier such as activated carbon is impregnated with an alkaline material are improved by impregnating the absorbent with a humectant, such as glycol and polyvinyl alcohol.

---

This invention relates to an absorbent for sulfur dioxide for use in gas mask canisters for protection against slufur dioxide.

Conventional materials used in canisters for absorbing sulfur dioxide consist of a granular carrier, such as diatomaceous earth or activated carbon, impregnated with an alkaline material, such as alkali metal or alkaline earth metal carbonates or hydroxides. Canisters filled with such absorbents suffer substantial decrease in absorbing capacity on storage. For example, alkali impregnated diatomaceous earth may suffer up to 50% loss in efficiency within a year. Absorbents using activated carbon carrier do not deteriorate as rapidly as those using diatomaceous earth, but they are initially somewhat less efficient.

It is an object of this invention to provide an alkaline absorbent for sulfur dioxide with improved storage stability. Another object is to provide a canister for protection against sulfur dioxide having improved efficiency and providing air that is more comfortable for breathing.

In accordance with this invention, a granular carrier is impregnated with an alkaline material and a hygroscopic polyalcohol that retains water in the absorbent thereby improving storage life and absorbing efficiency. Generally hygroscopic polyalcohols, that is, alcohols having more than one OH group, that do not react with the alkali are suitable for use in this invention. Glycol and polyvinyl alcohols are preferred. Glycerine is not suitable for use with activated carbon carrier as it tends to gum up after a relatively short time.

The polyalcohol is suitably mixed with an aqueous alkaline solution and impregnated into the granular carrier in the same manner as has heretofore been used for alkaline solutions alone.

The amount of polyalcohol used is suitably between about 0.5 and 20% by weight of the absorbent. Preferred amounts vary depending on the particular polyalcohol used; for example, it is preferred to use between about 3 and 10% glycol and between about 0.5 and 3% of a polyvinyl alcohol.

To illustrate the effectiveness of this invention, caniters of identical design were filled with identical amounts of a conventional absorbent consisting of activated carbon impregnated with potassium carbonate and the same absorbent with added glycol. When an air containing 1.4 parts by volume $SO_2$ was passed through the canisters at a rate of 20 liters/min., the conventional canister had a service life of 15 minutes while the canister with the absorbent containing glycol had a service life of 25 minutes. The effluent air from the conventional canister had a temperature of 41° C. and contained 50 g./cubic meter of water vapor, while the effluent from my new canister had a temperature of only 28° C. and a water content of 23 g./cubic meter. Similar improvement is obtained when other polyalcohols are used in place of glycol.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:
1. A sulfur dioxide absorbent consisting essentially of granular activated carbon impregnated with an alkaline material and from about 0.5 to 20% by weight of a polyalcohol selected from the group consisting of glycol and polyvinyl alcohols.
2. An absorbent according to claim 1 having between about 3 and 10% glycol.
3. An absorbent according to claim 1 having between about 0.5 and 3% polyvinyl alcohol.

References Cited

UNITED STATES PATENTS

| 179,664 | 7/1876 | McKentyre | 252—430 |
|---|---|---|---|
| 1,781,664 | 11/1930 | Rockwell | 252—447 |
| 2,537,448 | 1/1951 | Engel | 252—447 |
| 3,189,557 | 6/1965 | Shaler | 252—428 |
| 1,744,735 | 1/1930 | Berl | 23—2.1 |

OTHER REFERENCES

"Elvanol," Polyvinyl Alcohols, E. I. du Pont de Nemours and Co., Inc., 1947, pp. 5 and 40.

DANIEL E. WYMAN, *Primary Examiner.*

L. G. MANDONI, *Assistant Examiner.*